US007945764B2

(12) United States Patent
Mejdrich et al.

(10) Patent No.: US 7,945,764 B2
(45) Date of Patent: May 17, 2011

(54) PROCESSING UNIT INCORPORATING MULTIRATE EXECUTION UNIT

(75) Inventors: Eric Oliver Mejdrich, Rochester, MN (US); Adam James Muff, Rochester, MN (US); Matthew Ray Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 11/972,746

(22) Filed: Jan. 11, 2008

(65) Prior Publication Data
US 2009/0182987 A1 Jul. 16, 2009

(51) Int. Cl.
*G06F 9/30* (2006.01)
(52) U.S. Cl. ....................................... 712/214
(58) Field of Classification Search ........................ None
See application file for complete search history.

(56) References Cited

U.S. PATENT DOCUMENTS

| 6,038,675 A * | 3/2000 | Gabzdyl et al. | 713/600 |
| 7,149,880 B2 * | 12/2006 | Kottapalli | 712/214 |
| 2004/0243875 A1 * | 12/2004 | Dalvi | 713/501 |
| 2008/0109611 A1 * | 5/2008 | Liu et al. | 711/149 |

* cited by examiner

*Primary Examiner* — Robert Fennema
(74) *Attorney, Agent, or Firm* — Wood, Herron & Evans, LLP

(57) ABSTRACT

A multirate execution unit is capable of being operated in a plurality of modes, with the execution unit being capable of clocked at multiple different rates relative to a multithreaded issue unit such that, in applications where maximum performance is desired, the execution unit can be clocked at a rate that is faster than the clock rate for the multithreaded issue unit, and in applications where a lower power profile is desired, the execution unit can be throttled back to a slower rate to reduce the power consumption of the execution unit. When the execution unit is clocked at a faster rate than the multithreaded issue unit, the issue unit is permitted to issue more instructions per cycle than when the execution unit is throttled to the slower rate to increase overall instruction throughput.

24 Claims, 7 Drawing Sheets

PROCESSING UNIT INCORPORATING MULTIRATE EXECUTION UNIT

FIELD OF THE INVENTION

The invention is generally related to data processing, and in particular to processor architectures and execution units incorporated therein.

BACKGROUND OF THE INVENTION

As semiconductor technology continues to inch closer to practical limitations in terms of increases in clock speed, architects are increasingly focusing on parallelism in processor architectures to obtain performance improvements. At the chip level, multiple processor cores are often disposed on the same chip, functioning in much the same manner as separate processor chips, or to some extent, as completely separate computers. In addition, even within cores, parallelism is employed through the use of multiple execution units that are specialized to handle certain types of operations. Pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

One area where parallelism continues to be exploited is in the area of execution units, e.g., fixed point or floating point execution units. Many floating point execution units, for example, are deeply pipelined. However, while pipelining can improve performance, pipelining is most efficient when the instructions processed by a pipeline are not dependent on one another, e.g., where a later instruction does not use the result of an earlier instruction. Whenever an instruction operates on the result of another instruction, typically the later instruction cannot enter the pipeline until the earlier instruction has exited the pipeline and calculated its result. The later instruction is said to be dependent on the earlier instruction, and phenomenon of stalling the later instruction waiting for the result of an earlier instruction is said to introduce "bubbles," or cycles where no productive operations are being performed, into the pipeline.

One technique that may be used to extract higher utilization from a pipelined execution unit and remove unused bubbles is to introduce multithreading. In this way, other threads are able to issue instructions into the unused slots in the pipeline, which drives the utilization and hence the aggregate throughput up. Another popular technique for increasing performance is to use a single instruction multiple data (SIMD) architecture, which is also referred to as 'vectorizing' the data. In this manner, operations are performed on multiple data elements at the same time, and in response to the same SIMD instruction. A vector execution unit typically includes multiple processing lanes that handle different datapoints in a vector and perform similar operations on all of the datapoints at the same time. For example, for an architecture that relies on quad(4)word vectors, a vector execution unit may include four processing lanes that perform the identical operations on the four words in each vector.

The aforementioned techniques may also be combined, resulting in a multithreaded vector execution unit architecture that enables multiple threads to issue SIMD instructions to a vector execution unit to process "vectors" of data points at the same time. Typically, a scheduling algorithm is utilized in connection with issue logic to ensure that each thread is able to proceed at a reasonable rate, with the number of bubbles in the execution unit pipeline kept at a minimum.

While conventional scheduling algorithms are typically capable of minimizing bubbles and thus maximizing the utilization of an execution unit, instructions are still issued from threads at a fraction of the rate that could otherwise be issued were greater execution bandwidth available. With N threads available from an N-way multithreaded instruction unit, an issue unit could be designed to issue up to N instructions per cycle. With a conventional single pipelined execution unit, however, only one instruction can enter the pipeline and begin execution each cycle.

Addressing the disparity between instruction issue and instruction execution bandwidth could theoretically be addressed in several manners. For example, multiple execution units could be serviced by the same issue unit. In the alternative, an execution unit could be overclocked to operate at a faster rate than the multithreaded issue unit. Neither potential solution, however, is practical for some applications. The former solution would occupy substantially greater area on a chip and would consume significantly more power. The latter solution, while not presenting many of the same concerns with respect to chip area, would still increase power consumption due to the faster operating rate. In many applications, particularly low power and portable applications, however, the additional power consumption would be highly undesirable. It would be beneficial to be able to utilize a design for an execution unit that is capable of addressing both instruction execution bandwidth and power consumption concerns.

SUMMARY OF THE INVENTION

The invention addresses these and other problems associated with the prior art by providing a "multirate" execution unit capable of being operated in a plurality of modes, with the execution unit being capable of being clocked at multiple different rates relative to a multithreaded issue unit such that, in applications where maximum performance is desired, the execution unit can be clocked at a rate that is faster than that for the multithreaded issue unit, and in applications where a lower power profile is desired, the execution unit can be throttled back to a slower rate to reduce the power consumption of the execution unit. When the execution unit is clocked at a faster rate than the multithreaded issue unit, the issue unit is permitted to issue more instructions per cycle than when the execution unit is throttled to the slower rate to increase overall instruction throughput.

In one implementation, for example, a multirate execution unit consistent with the invention may be double clocked, and capable of clocked in a first mode at twice the rate as the issue unit responsive to a 2× multiplied clock signal. In addition, the execution unit may include two issue ports to receive instructions from an issue unit and alternately initiate execution of those instructions every other cycle. The issue unit may be configurable to issue two instructions per clock cycle, e.g., one to the first port of the execution unit on the rising edge of the non-multiplied clock signal and one to the second port of the execution unit on the falling edge of the non-multiplied clock signal. Consequently, the execution unit is clocked at 2× the rate of the issue unit in the first mode, and instructions are executed on both the rising and falling edges of the non-multiplied clock signal. In a second, reduced power mode, however, the execution unit may be slowed down and clocked at the same rate as the issue unit, and the issue unit may issue a single instruction per clock cycle to both issue ports of the execution unit. Thus, in the second mode the execution unit is clocked at the same rate as the issue unit, and half the rate of the execution unit in the first mode. Switching in the execution unit is therefore substantially reduced, thereby reducing the power consumption of the execution unit in the second mode.

Consistent with one aspect of the invention, a circuit arrangement includes a multithreaded issue unit configured to issue instructions from a plurality of threads and a multirate execution unit coupled to the multithreaded issue unit and configured to execute instructions issued thereto by the multithreaded issue unit. Control logic is coupled to the multithreaded issue unit and the multirate execution unit, and is configured to select from among a plurality of operating modes that includes first and second modes. In the first mode the control logic is configured to cause the multirate execution unit to be clocked at a first execution unit clock rate and in the second mode the control logic is configured to cause the multirate execution unit to be clocked at a second execution unit clock rate. The first execution unit clock rate is different from an issue unit clock rate at which the multithreaded issue unit is clocked, and the second execution unit clock rate is different from the first execution clock rate.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
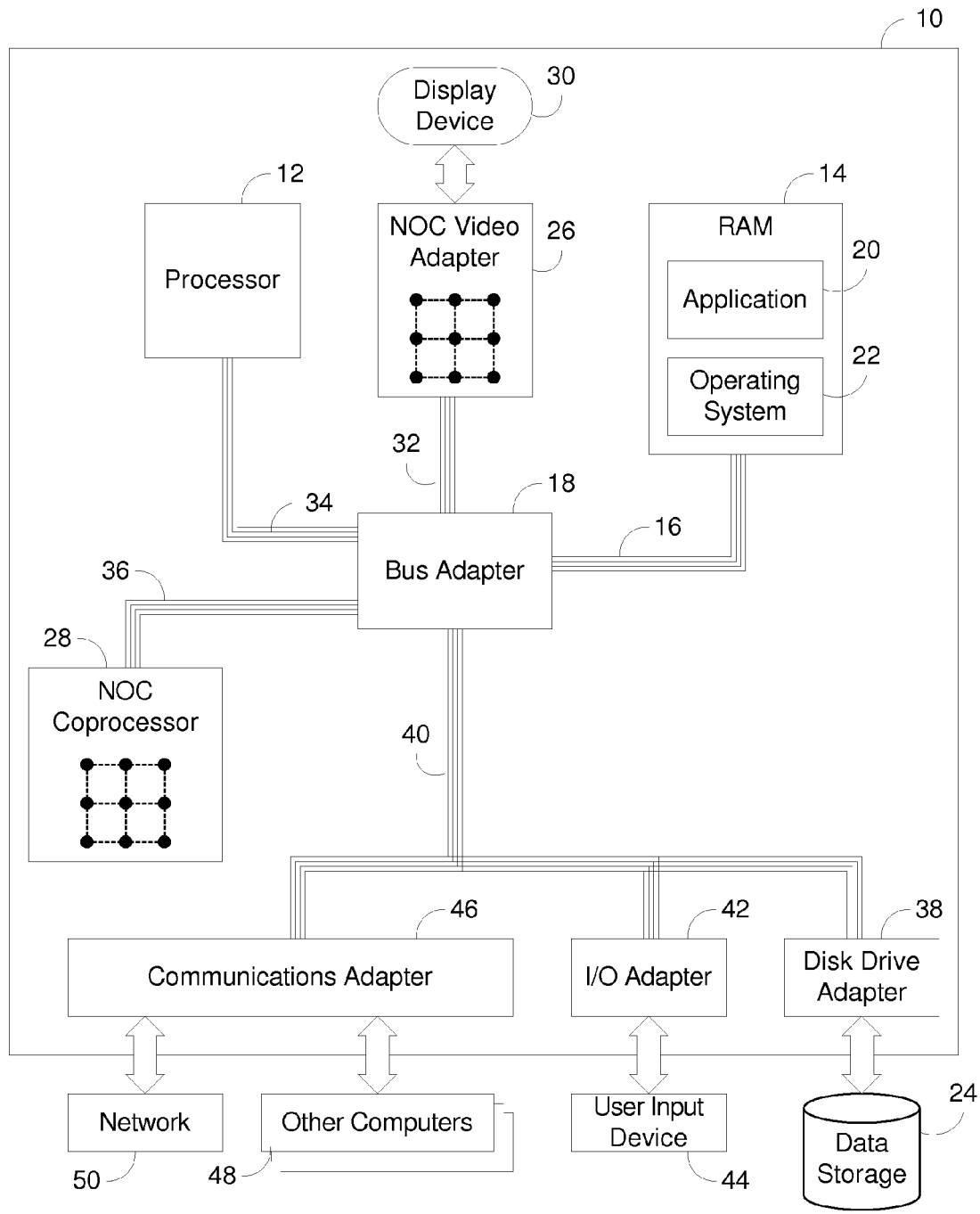
FIG. 1 is a block diagram of exemplary automated computing machinery including an exemplary computer useful in data processing consistent with embodiments of the present invention.

Embodiments consistent with the invention utilize a multirate execution unit capable of being operated in a plurality of modes, such that the same execution unit design can be configured to operate at different levels of performance and power consumption for different applications. In particular, some applications require maximum instruction throughput per thread, while other applications may have more modest throughput requirements, and may take advantage of lower power consumption. Embodiments consistent with the invention take advantage of a multirate execution unit capable of being overclocked relative to a multithreaded issue unit to provide maximum instruction throughput, but also with the option for a low power mode with reduced instruction throughput.

It will be appreciated that multiple modes may be dynamically supported in some embodiments so that the operating mode of the multirate execution unit is dynamically varied during runtime. In other embodiments, however, the selection of an operating mode for the multirate execution unit may be statically defined in a particular application, thus enabling the same basic circuit design to be used in different types of applications.

A multirate execution unit consistent with the invention is capable of operating in two or more operating modes in which the execution unit is clocked at different rates compared to a multithreaded issue unit. A multirate execution unit may support a mode where the execution unit clock rate is the same rate as the issue unit clock rate, although in some embodiments, the multirate execution unit may only support clock rates that are greater than the issue unit clock rate (e.g., a multirate execution unit may support 2× and 4× modes relative to an issue unit clock rate). It will also be appreciated that a multirate execution unit consistent with the invention may be implemented as any number of different execution units, e.g., vector or scalar units, floating point units, fixed point units, specialized units such as encryption/decryption units, graphics processing units, or coprocessors, or any other circuit logic capable of executing microcoded instructions.

A multithreaded issue unit consistent with the invention also supports multiple modes of operation, and in at least one mode of operation, the multithreaded issue unit is capable of issuing more than one instruction per issue unit clock cycle, with the number of instructions being issued per cycle being configured to match the rate at which the multirate execution unit can receive instructions in a particular mode. It will be appreciated that the issue units illustrated herein are described as being capable of issuing a certain number of instructions per issue unit clock cycle, e.g., one instruction per cycle or two instructions per cycle. While so configured, it will be appreciated that due to dependencies, branches and other factors, an issue unit may not issue the maximum permitted number of instructions per cycles in certain cycles. Consequently, it will be appreciated that an issue unit that is described as issuing N instructions per cycle issues a maximum of N instructions per cycle, but that in some cycles, less than this maximum number of instructions may be issued.

Control logic is used in embodiments of the invention to switch both the multirate execution unit and the multithreaded issue unit between different modes. It will be appreciated that in some embodiments, the only control required to switch an execution unit between different modes is a clock signal, as in such embodiments the execution unit operates functionally in the identical manner in different modes. In other embodiments, however, control logic may additionally enable or disable logic in the multirate execution unit to accommodate different modes of operation.

Switching a multithreaded issue unit between different modes, on the other hand, typically involves configuring the issue unit to issue a different number of instructions per issue clock cycle. Different manners of changing the number of instructions issued per cycle may be used consistent with the invention, and will be described in greater detail below.

It will be appreciated that the control logic described herein may be implemented in whole or in part within either a multirate execution unit and/or a multithreaded issue unit, or may be implemented separately from either unit. Other modifications will be apparent to one of ordinary skill in the art having the benefit of the instant disclosure.

Hardware and Software Environment

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
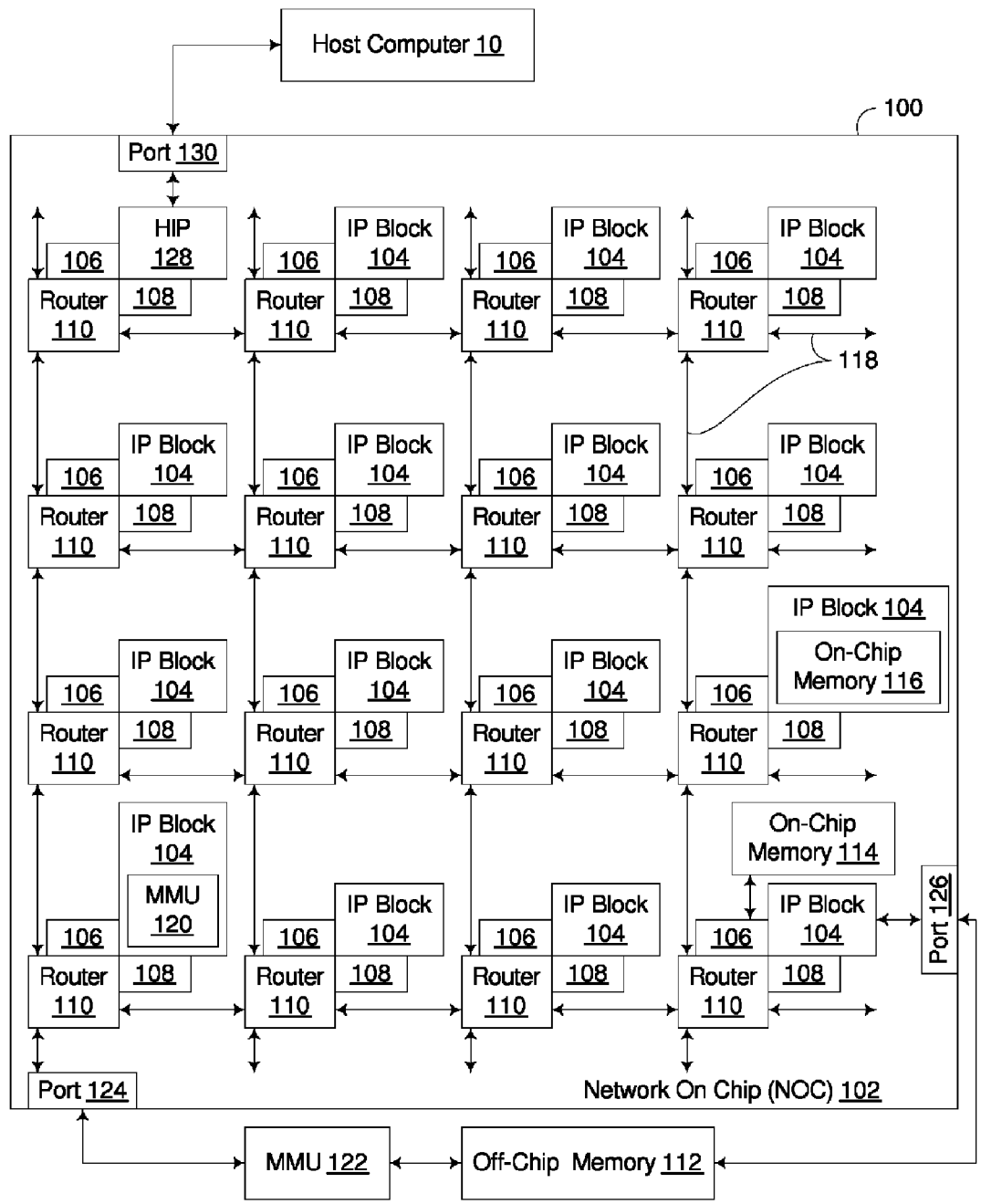
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices and data processing systems utilizing such devices, those of ordinary skill in the art having the benefit of the instant disclosure will appreciate that circuit arrangements consistent with the invention are capable of being distributed as program products in a variety of forms, and that the invention applies equally regardless of the particular type of computer readable or signal bearing media being used to actually carry out the distribution. Examples of computer readable or signal bearing media include, but are not limited to, physical, recordable type media such as volatile and non-volatile memory devices, floppy disks, hard disk drives, CD-ROMs, and DVDs (among others), and transmission type media such as digital and analog communication links.

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
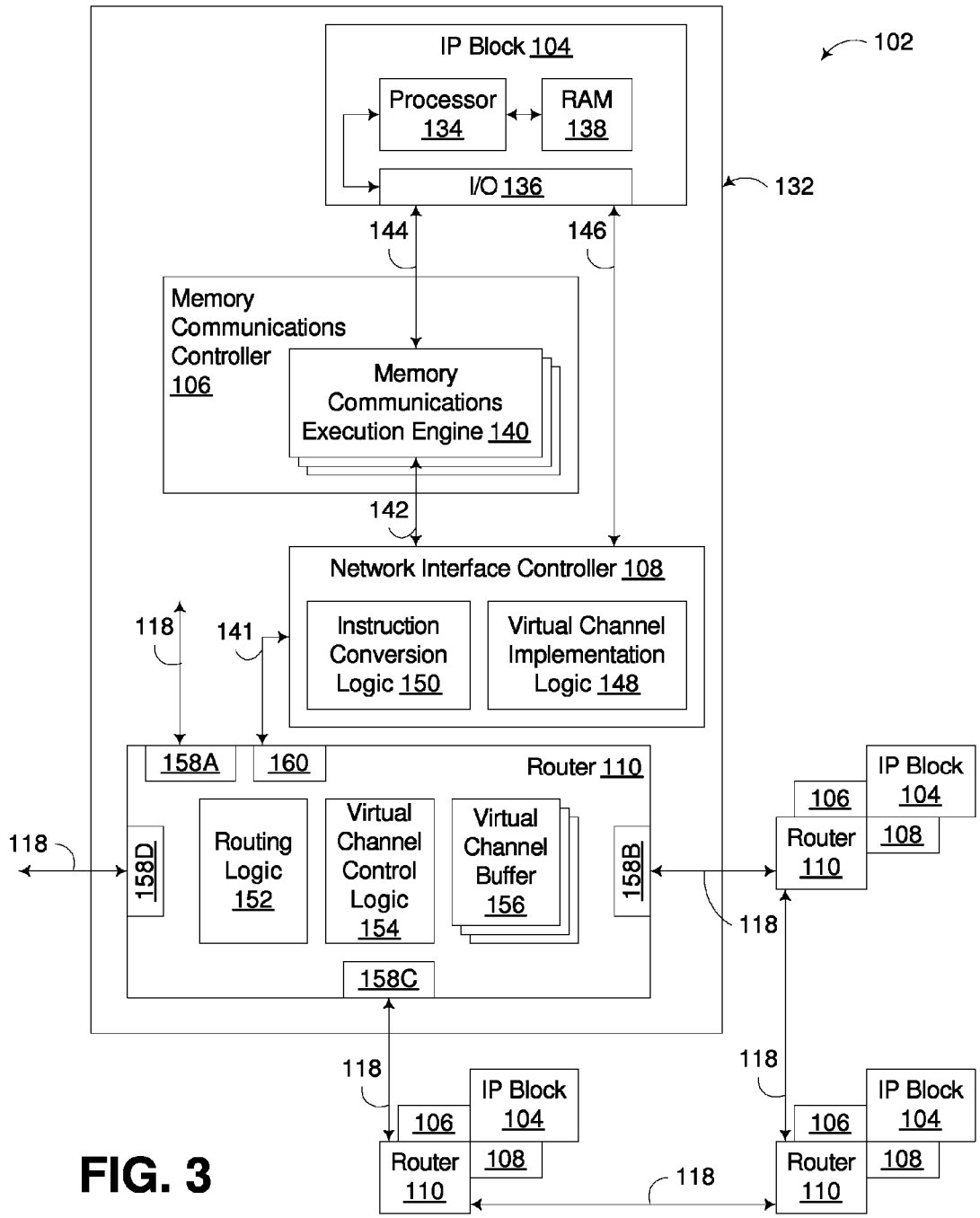
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
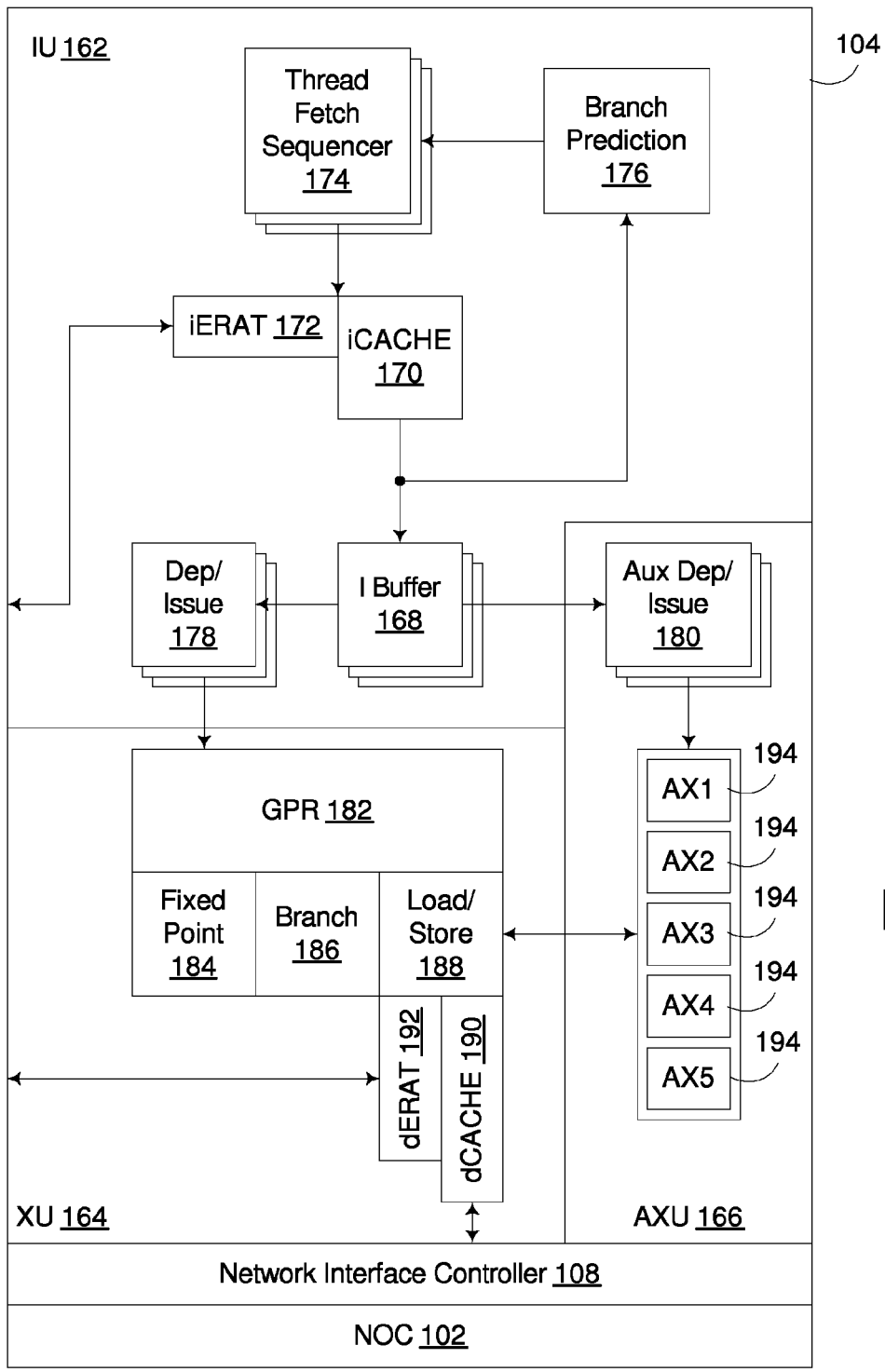
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Multirate Execution Unit

Figure 5:
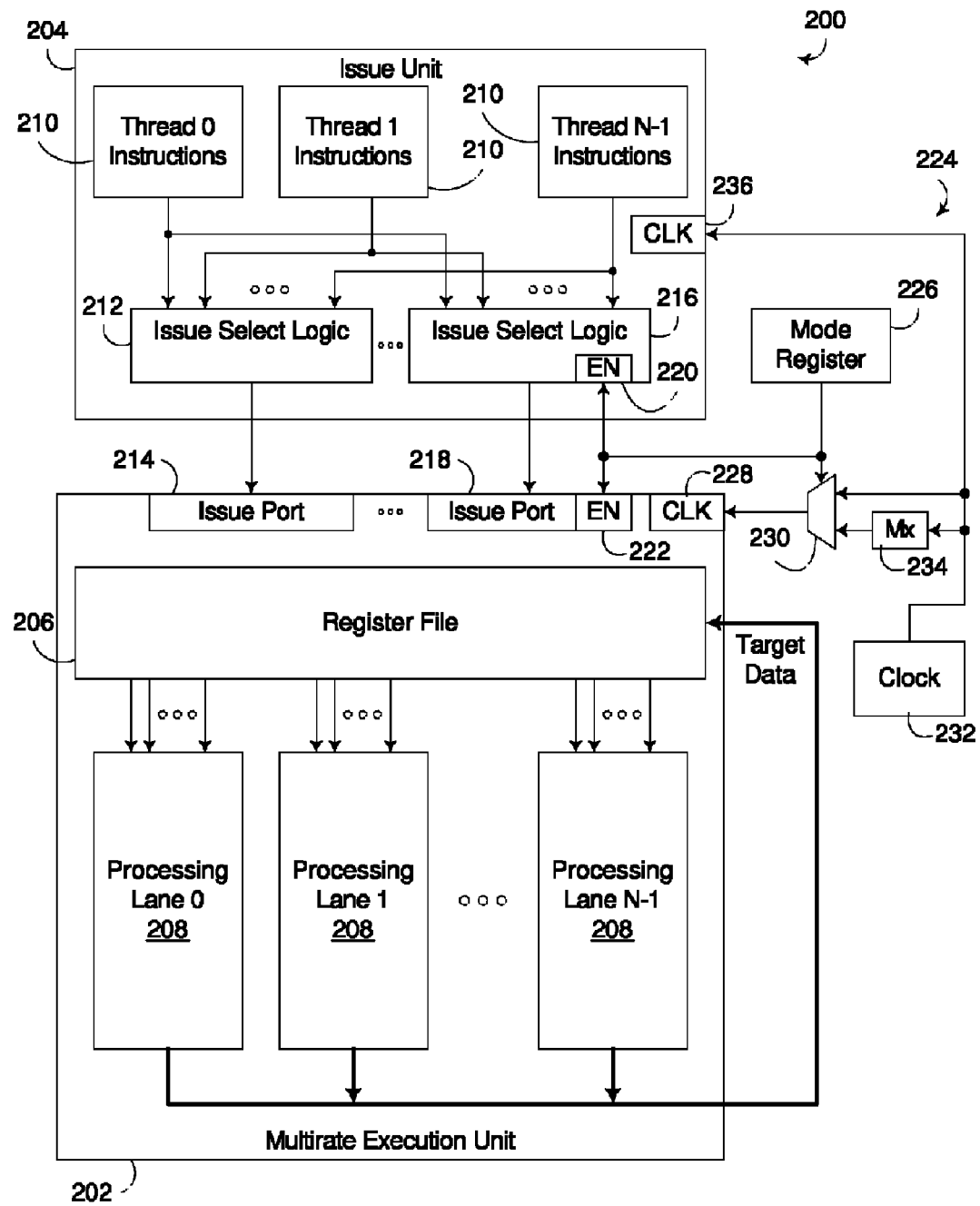
FIG. 5 is a block diagram of a multirate execution unit consistent with the invention, and capable of being implemented within an IP block from the NOC of FIG. 2.

Turning now to FIG. 5, this figure illustrates an exemplary processing unit 200 incorporating a multirate execution unit 202 consistent with the invention. Processing unit 200 may be implemented, for example, in an IP block such as an IP block 104 from FIGS. 1-4. In the alternative, processing unit 200 may be implemented in other processor architectures that issue and execute instructions, including single or multi-core microprocessors or microcontrollers.

Multirate execution unit 202 processes instructions issued to the execution unit by an issue unit 204, and includes a register file 206 coupled to a plurality of (N) processing lanes or sub-units 208 capable of processing data stored in register file 206 based upon the instructions issued by issue logic 204, and storing target data back to the register file. Multirate execution unit 202 may be implemented as a number of different types of execution units, e.g., floating point units, fixed point units, or specialized execution units such as graphics processing units, encryption/decryption units, coprocessors, XML processing units, etc., and may be implemented either as a vector or scalar-based unit. If a scalar-based unit, typically only one processing lane 208 would be used, and if a vector-based unit, the N processing lanes would operate as an N-word vector unit.

Issue unit 204 is a multithreaded issue unit capable of receiving instructions from multiple (N) threads 210. Primary issue select logic 212 operates to schedule the issuance of instructions by the various threads, and typically includes logic for managing dependencies between instructions, in a manner generally understood in the art. Issue select logic 212 outputs instructions to an issue port 214 in multirate execution unit 202, which causes the execution unit to initiate execution of received instructions. In a pipelined execution unit, and absent dependencies, issue port 214 is typically capable of receiving an instruction each execution unit clock cycle.

In order to support multiple modes of operation, issue unit 204 includes one or more secondary issue select logic blocks 216, each of which outputs to an associated issue port 218 in multirate execution unit 202. In the embodiment of FIG. 5, one or both of issue select logic 216 and issue port 218 includes enable logic 220, 222 capable of selectively enabling or disabling either or both of the issue select logic 216 and issue port 218, such that, in certain modes of operation, instructions are not issued and executed by the execution unit through the pathway from issue select logic 216 and issue port 218. By enabling one or more of the pathways defined by issue select logic 216 and issue port 218, multiple instructions are capable of being issued to the execution unit per issue unit clock cycle.

Issue ports 214, 218 in the embodiment of FIG. 5 are configured to be polled on sequential execution unit clock cycles to initiate the execution of instructions awaiting execution at such ports. Thus, with two issue ports, 214, 218, instructions received through issue port 214 might be executed on odd cycles, with instructions received through issue port 218 executed on even cycles. When more than three issue ports are provided, a round robin algorithm may be used such that each issue port initiates execution of an instruction every third cycle.

In the illustrated embodiment, an issue port that is disabled is skipped in the round robin polling of issue ports. In the alternative, multiple issue select logic blocks may be coupled to a given issue port such that instructions from multiple issue select logic blocks may be routed through the issue port. For example, in an embodiment where one primary select logic block 212 and one secondary issue select logic block 216 is provided, and in one mode the secondary issue select logic block 216 is disabled, primary select logic block 212 could be coupled to both of issue port 214 and issue port 218 to issue instructions every execution unit clock cycle.

Issue select logic 216 and/or issue port 218 are selectively enabled or disabled responsive to control logic 224, which is capable of configuring multirate execution unit 202 and multithreaded issue unit 204 to operate in multiple modes. Control logic 224 includes a mode register 226, which may be a software-writeable special purpose register, which selectively enables or disables one or both of issue select logic 216 and issue port 218. In addition, mode register 226 of control logic 224 controls a clock signal provided to a clock input 228 of multirate execution unit 202, via control over a multiplexer 230. Multiplexer 230 has one input that receives a clock signal output by a clock generator 232, and another input that receives a multiplied clock signal generated by a Mx multiplier 234 (e.g., where M=2, 4, etc.). The clock signal output by clock generator 232 also drives a clock input 236 to multithreaded issue unit 204, although in other embodiments, separate clocks may be generated for units 202, 204. In addition, if more than two modes are supported, multiplexer 230 may have more than two inputs in order to support more than two execution unit clock rates, and mode register 226 may output multiple enable signals to selectively enable or disable various issue select logic and/or issue ports as required to control the number of instructions issued by the multithreaded issue unit 204 per issue unit clock cycle.

Assume, for example, that processing unit 200 supports two modes of operation, a first, high performance mode where the multirate execution unit is double clocked relative to the multithreaded issue unit and the multithreaded issue unit issues two instructions per issue unit clock cycle, and a second, low power mode where the multirate execution unit is clocked at the same rate as the multithreaded issue unit and the multithreaded issue unit issues one instruction per issue unit clock cycle. In such a configuration, clock multiplier 234 would be a 2× multiplier, and two total issue select logic blocks, and two total issue ports, would be provided.

In the first, double clocked or high performance mode, mode register 226 enables issue select logic 216 and issue port 218, and via control over multiplexer 230, mode register 226 outputs a double rate clock generated by multiplier 234 to clock input 228 of multirate execution unit 202. Issue select logic 212 may be configured to operate on the rising edge of the issue unit clock signal input at clock input 236, and issue select logic 216 may be configured to operate on the falling edge of the issue unit clock signal. Furthermore, multirate execution unit 202 alternates between polling or sampling issue ports 214 and 218 every execution unit clock cycle such that instructions received by each issue port are executed every other cycle.

Figure 6:
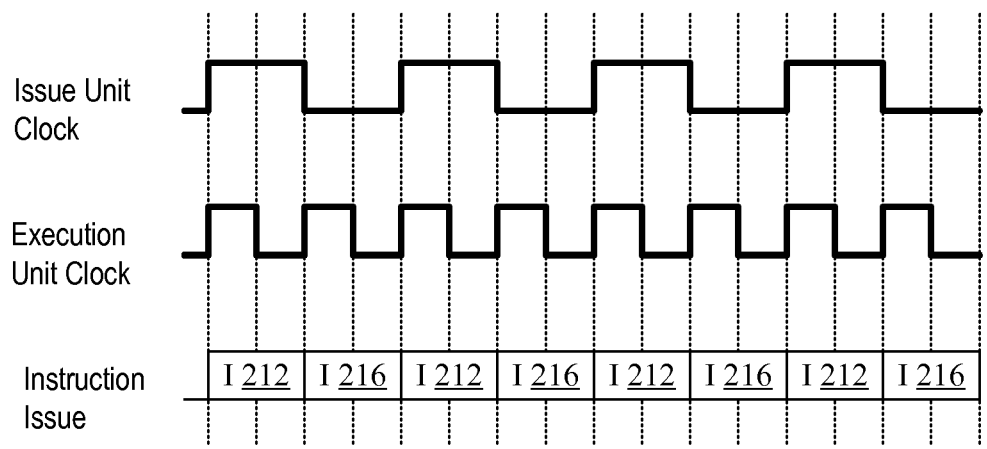
FIG. 6 is a timing diagram illustrating the issuance and execution of instructions by the multirate execution unit of FIG. 5 when operating in a double clocked mode.

With further reference to FIG. 6, with multirate execution unit 202 operating at a double clock rate relative to multithreaded issue unit 204, an instruction issued by issue select logic 212 on the rising edge of the issue unit clock will be sampled by issue port 214 to initiate execution of that instruction by the execution unit. Then, on the falling edge of the issue unit clock (and the next rising edge of the double rate execution unit clock), an instruction issued by issue select logic 216 will be sampled by issue port 218 to initiate execution of that instruction by the execution unit. As such, execution unit 202 will alternate between executing instructions issued by issue select logic 212 and 216 each successive execution unit clock cycle.

Figure 7:
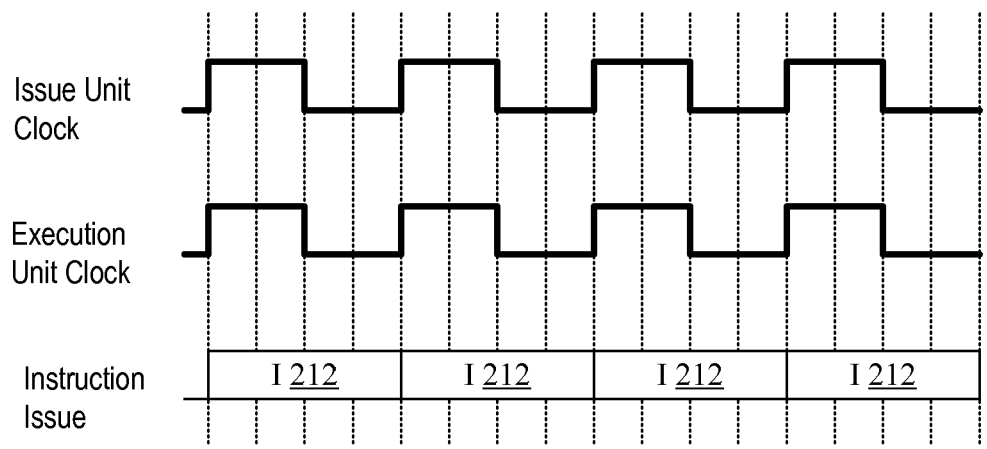
FIG. 7 is a timing diagram illustrating the issuance and execution of instructions by the multirate execution unit of FIG. 5 when operating in a single clocked mode.

Returning to FIG. 5, in the second, single clocked or low power mode, mode register 226 disables issue select logic 216 and issue port 218, and via control over multiplexer 230, mode register 226 outputs a single rate clock to clock input 228 of multirate execution unit 202, such that execution unit 202 and issue unit 204 receive the same clock signal. With issue select logic 216 and issue port 218 disabled, instructions are only issued by issue select logic 212 via issue port 214. Thus, with further reference to FIG. 7, with multirate execution unit 202 operating at the same clock rate as multithreaded issue unit 204, an instruction will be issued by issue select logic 212 on the rising edge of the issue unit clock and sampled by issue port 214 to initiate execution of that instruction by the execution unit. As such, execution unit 202 will execute instructions at half the rate in the single clocked mode, but also with roughly half the power consumption.

Figure 8:
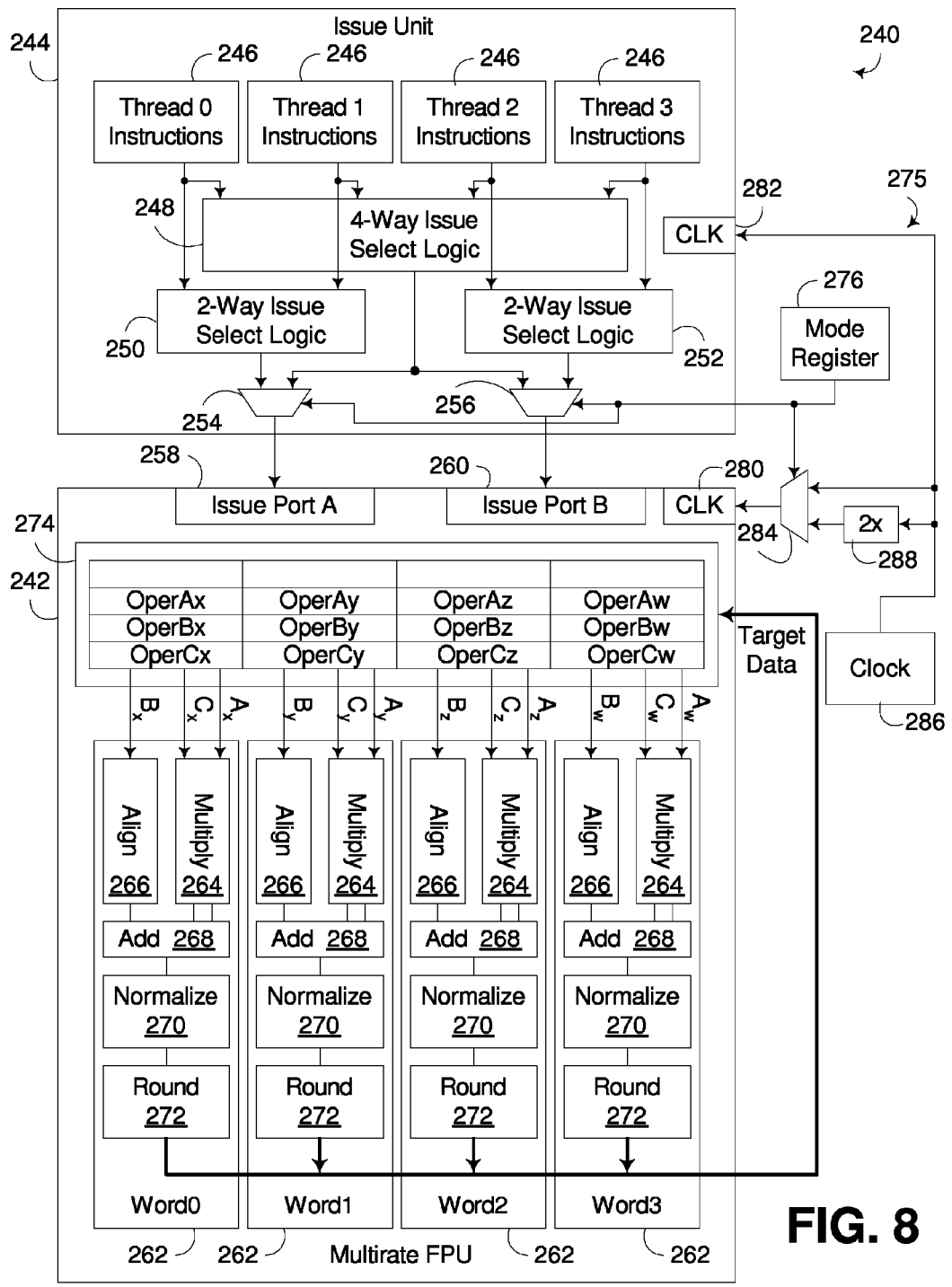
FIG. 8 is a block diagram of an alternate implementation of a multirate execution unit to that of FIG. 5, implementing a multirate floating point execution unit.

As noted above, various manners of configuring an issue unit to issue multiple instructions to an execution unit may be used consistent with the invention. FIG. 8, for example, illustrates an alternative embodiment of a processing unit 240 incorporating a multirate execution unit 242 consistent with the invention. Execution unit 242 is implemented as a vector floating point unit, e.g., as might be used for image processing, which processes single instruction multiple data (SIMD) instructions issued to the execution unit by issue logic 244. Execution unit 242 includes a register file 274 coupled to four processing lanes or sub-units 262 capable of processing vectors including up to four words of data stored in register file 274 based upon the instructions issued by issue logic 244, and storing target data back to the register file.

Given the configuration of processing unit 240 as a floating point unit usable in image processing applications, each processing lane 262 is configured to process floating point instructions. While a wide variety of other floating point architectures may be used in the alternative, processing unit 240 includes a pipelined floating point execution architecture capable of operating on three vector operands, denoted A, B and C. For vector operations, four word vectors are supported, with the words in each vector being denoted as X, Y, Z and W (e.g., where X, Y, Z, and W refer to the coordinates of a vertex), and as such, each processing lane 262 receives three operand words, one from each vector. Thus, for example, for the processing lane 262 that processes the X word from each vector, the operands fed to that processing lane are denoted as $A_X$, $B_X$ and $C_X$.

Each processing lane 262 is configured to perform an operation in parallel with one or more other processing lanes. For example, each processing lane may multiply a pair of operands to perform a cross product or dot product operation. By multiplying different pairs of operands in different processing lanes of the vector unit, vector operations may be performed faster and more efficiently.

Each processing lane 262 is also pipelined to further improve performance. Accordingly, each processing lane 262 includes a plurality of pipeline stages for performing one or more operations on the operands. For example, for a first stage, each processing lane may include a multiplier 264 for multiplying the A and C operands. In one embodiment of the invention, the multiplication of operands may be performed in a first stage of the pipeline as illustrated in FIG. 8.

Each processing lane 262 may also include an aligner 266 for aligning operand B with the product computed by multiplier 264, in parallel with the computation of the product. While alignment is shown in the same pipeline stage in FIG. 8, one skilled in the art will recognize that the multiplication and alignment may be performed in separate pipeline stages in other embodiments.

Each processing lane 262 may also include an adder 268 for adding two or more operands. In one embodiment (illustrated in FIG. 8), each adder 268 is configured to receive the product computed by multiplier 264 (output as a sum and carry), and add the product to the aligned operand output by aligner 266. Therefore, each processing lane 262 may be configured to perform a multiply-add instruction. One skilled in the art will recognize that multiply-add instructions are frequently performed in vector operations. Therefore, by performing several multiply add instructions in parallel lanes, the efficiency of vector processing may be significantly improved.

Each vector processing lane 262 may also include a normalizing stage, and a rounding stage, as illustrated in FIG. 8. Accordingly, a normalizer 270 may be provided in each processing lane. Normalizer 270 may be configured to represent a computed value in a convenient exponential format. For example, normalizer 270 may receive the value 0.0000063 as a result of an operation. Normalizer 270 may convert the value into a more suitable exponential format, for example, $6.3 \times 10-6$. The rounding stage may incorporate a rounder 272 that is capable of rounding a computed value to a desired number of decimal points. For example, a computed value of 10.5682349 may be rounded to 10.568 if only three decimal places are desired in the result. In one embodiment of the invention rounder 272 may round the least significant bits of the particular precision floating point number the rounder is designed to work with.

One skilled in the art will recognize that embodiments of the invention are not limited to the particular pipeline stages, components, and arrangement of components described above and in FIG. 8. For example, in some embodiments, aligner 266 may be configured to align operand B, a product computed by multiplier 242, or both. Furthermore, embodiments of the invention are not limited to the particular components described in FIG. 8. Any combination of the illustrated components and additional components such as, but not limited to, leading zero adders, dividers, etc. may be included in each processing lane 262 consistent with the invention.

Issue logic 244 in processing unit 240 is capable of issuing instructions from four threads, illustrated at 246. A 4-way issue select logic block 248 receives instructions from all four threads 246, and first and second 2-way issue select logic blocks 250, 252 respectively receive instructions from threads 0, 1 and 2, 3. Each issue select logic block 248, 250, 252 includes logic for arbitrating between multiple threads and for handling dependencies. Furthermore, each is configured to output a single instruction each issue unit clock cycle.

A first multiplexer 254 is coupled to the outputs of 4-way issue select logic block 248 and first 2-way issue select block 250, and a second multiplexer 256 is coupled to the outputs of 4-way issue select logic block 248 and second 2-way issue select block 252. Multiplexer 254 outputs to a first issue port 258 in multirate execution unit 242, while multiplexer 256 outputs to a second issue port 260.

Control logic 275 controls multirate execution unit 242 and multithreaded issue unit 244 to operate in one of first and second modes. In a first, high performance mode the multirate execution unit is double clocked relative to the multithreaded issue unit and the multithreaded issue unit issues two instructions per issue unit clock cycle. In a second, low power mode the multirate execution unit is clocked at the same rate as the multithreaded issue unit and the multithreaded issue unit issues one instruction per issue unit clock cycle.

Control logic 275 includes a mode register 276, which may be a software-writeable special purpose register, which outputs a select signal to each of multiplexers 254 and 256 to select between, in the first mode, 2-way issue select logic blocks 250, 252, and in the second mode, 4-way issue select logic block 248. In addition, mode register 276 of control logic 275 controls a clock signal provided to a clock input 280 of multirate execution unit 242, via control over a multiplexer 284. Multiplexer 284 has one input that receives a clock signal output by a clock generator 286, and another input that receives a multiplied clock signal generated by a 2× multiplier 288. The clock signal output by clock generator 286 also drives a clock input 282 to issue unit 244.

In the first, double clocked or high performance mode, mode register 276 respectively couples 2-way issue select logic blocks 250 and 252 to issue ports 258, 260, via control over multiplexers 254, 256. In addition, via control over multiplexer 284 mode register 276 outputs a double rate clock generated by multiplier 288 to clock input 280 of multirate execution unit 242. 2-way issue select logic 250 may be configured to operate on the rising edge of the issue unit clock signal input at clock input 282, and 2-way issue select logic 252 may be configured to operate on the falling edge of the issue unit clock signal. Furthermore, multirate execution unit 242 alternates between polling or sampling issue ports 258 and 260 every execution unit clock cycle such that instructions received by each issue port are executed every other cycle.

Consequently, as with processing unit 200 of FIG. 5, multirate execution unit 242 of FIG. 8 operates at a double clock rate relative to multithreaded issue unit 244, and instructions issued by 2-way issue select logic 250 on the rising edge of the issue unit clock will be sampled by issue port 258 to initiate execution of that instruction by the execution unit. Then, on the falling edge of the issue unit clock (and the next rising edge of the double rate execution unit clock), an instruction issued by 2-way issue select logic 252 will be sampled by issue port 260 to initiate execution of that instruction by the execution unit. As such, execution unit 242 will alternate between executing instructions issued by issue select logic 250 and 252 each successive execution unit clock cycle.

In the second, single clocked or low power mode, mode register 276 couples 4-way issue select logic 248 to both of issue ports 258, 260, via control over multiplexers 254, 256. In addition, via control over multiplexer 284, mode register 276 outputs a single rate clock to clock input 280 of multirate execution unit 242, such that execution unit 242 and issue unit 244 receive the same clock signal. With 4-way issue select logic 248 coupled to both issue ports 258, each issue port still initiates execution of an instruction every other cycle; however, with the execution unit clock rate being equal to that of the issue unit, the 4-way issue select logic 248 is capable of issuing a single instruction per clock cycle, and having that instruction received by one of the issue ports for execution by the execution unit. Thus, as with processing unit 200 of FIG. 5, multirate execution unit 242 of FIG. 8 operates at the same clock rate as multithreaded issue unit 244, and an instruction will be issued each cycle by 4-way issue select logic 248 and sampled by one of issue ports 258, 260 to initiate execution of that instruction by the execution unit. As such, execution unit 242 will execute instructions at half the rate in the single clocked mode, but also with roughly half the power consumption.

It will be appreciated that a wide variety of alternate designs may be used to control the number of instructions that are issued by a multithreaded issue unit per cycle in order to match the throughput of an overclocked multirate execution unit. In addition, various additional modifications may be made without departing from the spirit and scope of the invention. Therefore, the invention lies in the claims hereinafter appended.

What is claimed is:

1. A circuit arrangement, comprising:
   a double clocked vector execution unit configured to be clocked in a first mode by a first clock signal, and to be clocked in a second mode by a second clock signal that has a clock rate that is twice that of the first clock signal, the double clocked vector execution unit including first and second issue ports, wherein the double clocked vector execution unit is configured to, during each clock cycle, alternate between initiating execution of an instruction received from the first issue port and initiating execution of an instruction received from the second issue port;
   a multithreaded issue unit coupled to the first and second issue ports and responsive to the first clock signal, the multithreaded issue unit configured to receive instructions from a plurality of threads, the multithreaded issue unit further configured in the first mode to issue one instruction from among the plurality of threads per cycle of the first clock signal to at least one of the first and second issue ports such that the double clocked vector execution unit initiates execution of one instruction per cycle of the first clock signal, and further configured in a second mode to issue two separate instructions from among the plurality of threads to the first and second issue ports per cycle of the first clock signal such that the double clocked vector execution unit initiates execution of two instructions per cycle of the first clock signal.

2. A circuit arrangement, comprising:
   a multithreaded issue unit configured to issue instructions from a plurality of threads;
   a multirate execution unit coupled to the multithreaded issue unit and configured to execute instructions issued thereto by the multithreaded issue unit; and
   control logic coupled to the multithreaded issue unit and the multirate execution unit, the control logic configured to select from among a plurality of operating modes that includes first and second modes, wherein in the first mode the control logic is configured to cause the multirate execution unit to be clocked at a first execution unit clock rate relative to an issue unit clock rate at which the multithreaded issue unit is clocked and in the second mode the control logic is configured to cause the multirate execution unit to be clocked at a second execution unit clock rate relative to the issue unit clock rate, wherein the first execution unit clock rate is different from the issue unit clock rate, and wherein the second execution unit clock rate is different from the first execution unit clock rate.

3. The circuit arrangement of claim 2, wherein the control logic is configured to in the first mode configure the multithreaded issue unit to issue multiple instructions to the multirate execution unit per issue unit clock cycle.

4. The circuit arrangement of claim 3, wherein the second execution unit clock rate is the same as the issue unit clock rate, and wherein the control logic is configured in the second mode to configure the multithreaded issue unit to a single instruction to the multirate execution unit per issue unit clock cycle.

5. The circuit arrangement of claim 3, wherein the second execution unit clock rate is different from the issue unit clock rate, and wherein the control logic is configured in the second mode to configure the multithreaded issue unit to issue multiple instructions to the multirate execution unit per instruction clock cycle.

6. The circuit arrangement of claim 3, wherein the first execution unit clock rate is double the issue unit clock rate, and wherein the second execution unit clock rate equals the issue unit clock rate.

7. The circuit arrangement of claim 6, wherein the multirate execution unit includes first and second issue ports and is configured to alternate in each clock cycle between initiating execution of an instruction received in the first issue port and initiating execution of an instruction received in the second issue port.

8. The circuit arrangement of claim 7, wherein the multithreaded issue unit is configured to receive instructions from N threads, and wherein the multithreaded issue unit further comprises:
   first and second multiplexers coupled respectively to the first and second issue ports of the multirate execution unit;
   first issue select logic coupled to a first input of the first multiplexer, the first issue select logic configured to select one instruction from among a first subset of the N threads each cycle of the issue unit clock;
   second issue select logic coupled to a first input of the second multiplexer, the second issue select logic configured to select one instruction from among a second subset of the N threads each cycle of the issue unit clock; and third issue select logic coupled to second inputs of each of the first and second multiplexers, the third issue select logic configured to select one instruction from among the N threads each cycle of the issue unit clock;

wherein the control logic is coupled to the first and second multiplexers and configured in the first mode to select the first inputs of the first and second multiplexers such that an instruction selected by the first issue select logic is output to the first issue port to initiate execution thereof on the rising edge of the issue unit clock and an instruction selected by the second issue select logic is output to the second issue port to initiate execution thereof on the falling edge of the issue unit clock, and wherein the control logic is configured in the second mode to select the second inputs of the first and second multiplexers such that an instruction selected by the third issue select logic is output to the first and second issue ports to initiate execution thereof on the rising edge of the issue unit clock.

9. The circuit arrangement of claim 7, wherein the multithreaded issue unit is configured to receive instructions from N threads, and wherein the multithreaded issue unit further comprises:
 first N-way issue select logic configured to select one instruction from among the N threads each cycle of the issue unit clock and output the selected instruction to the first issue port of the multirate execution unit;
 second N-way issue select logic configured to select one instruction from among the N threads each cycle of the issue unit clock and output the selected instruction to the second issue port of the multirate execution unit;
 wherein the control logic is configured in the second mode to disable at least one of the second issue port and the second N-way issue select logic.

10. The circuit arrangement of claim 2, wherein the control logic includes a mode register configured to be written to by software to select from among the plurality of modes.

11. The circuit arrangement of claim 2, wherein the multirate execution unit comprises a vector floating point unit.

12. An integrated circuit device including the circuit arrangement of claim 2.

13. A program product comprising a recordable computer readable medium and logic definition program code resident on the computer readable medium and defining the circuit arrangement of claim 2.

14. A method of operating a multirate execution unit of the type configured to execute instructions issued by a multithreaded issue unit that is configured to issue instructions from a plurality of threads, the method comprising:
 selecting from among a plurality of modes that includes first and second modes;
 in response to selecting the first mode, causing the multirate execution unit to be clocked at a first execution unit clock rate relative to an issue unit clock rate at which the multithreaded issue unit is clocked and that is different from the issue unit clock rate; and
 in response to selecting the second mode, causing the multirate execution unit to be clocked at a second execution unit clock rate relative to the issue unit clock rate that is different from the first execution clock rate.

15. The method of claim 14, further comprising, in response to selecting the first mode, causing the multithreaded issue unit to issue multiple instructions to the multirate execution unit per issue unit clock cycle.

16. The method of claim 15, wherein the second execution unit clock rate is the same as the issue unit clock rate, the method further comprising, in response to selecting the second mode, causing the multithreaded issue unit to issue a single instruction to the multirate execution unit per issue unit clock cycle.

17. The method of claim 15, wherein the second execution unit clock rate is different from the issue unit clock rate, the method further comprising, in response to selecting the second mode, causing the multithreaded issue unit to issue multiple instructions to the multirate execution unit per instruction clock cycle.

18. The method of claim 15, wherein the first execution unit clock rate is double the issue unit clock rate, and wherein the second execution unit clock rate equals the issue unit clock rate.

19. The method of claim 18, wherein the multirate execution unit includes first and second issue ports and is configured to alternate in each clock cycle between initiating execution of an instruction received in the first issue port and initiating execution of an instruction received in the second issue port.

20. The method of claim 19, wherein the multithreaded issue unit is configured to receive instructions from N threads, and wherein the multithreaded issue unit further comprises first and second multiplexers coupled respectively to the first and second issue ports of the multirate execution unit, first issue select logic coupled to a first input of the first multiplexer and configured to select one instruction from among a first subset of the N threads each cycle of the issue unit clock, second issue select logic coupled to a first input of the second multiplexer and configured to select one instruction from among a second subset of the N threads each cycle of the issue unit clock, and third issue select logic coupled to second inputs of each of the first and second multiplexers and configured to select one instruction from among the N threads each cycle of the issue unit clock, wherein the method further comprises:
 in response to selecting the first mode, selecting the first inputs of the first and second multiplexers such that an instruction selected by the first issue select logic is output to the first issue port to initiate execution thereof on the rising edge of the issue unit clock and an instruction selected by the second issue select logic is output to the second issue port to initiate execution thereof on the falling edge of the issue unit clock; and
 in response to selecting the second mode, selecting the second inputs of the first and second multiplexers such that an instruction selected by the third issue select logic is output to the first and second issue ports to initiate execution thereof on the rising edge of the issue unit clock.

21. The method of claim 19, wherein the multithreaded issue unit is configured to receive instructions from N threads, and wherein the multithreaded issue unit further comprises first N-way issue select logic configured to select one instruction from among the N threads each cycle of the issue unit clock and output the selected instruction to the first issue port of the multirate execution unit, and second N-way issue select logic configured to select one instruction from among the N threads each cycle of the issue unit clock and output the selected instruction to the second issue port of the multirate execution unit, the method further comprising, in response to selecting the second mode, disabling at least one of the second issue port and the second N-way issue select logic.

22. The method of claim 14, wherein selecting from among the plurality of modes includes in software initiating a write to a mode register.

23. The method of claim 14, wherein the multirate execution unit comprises a vector floating point unit.

24. A circuit arrangement, comprising:
a multithreaded issue unit configured to issue instructions from a plurality of threads;
a multirate execution unit coupled to the multithreaded issue unit and configured to execute instructions issued thereto by the multithreaded issue unit; and
control logic coupled to the multithreaded issue unit and the multirate execution unit, the control logic configured to select from among a plurality of operating modes that includes first and second modes, wherein in the first mode the control logic is configured to cause the multirate execution unit to be clocked at a first execution unit clock rate and in the second mode the control logic is configured to cause the multirate execution unit to be clocked at a second execution unit clock rate, wherein the first execution unit clock rate is different from an issue unit clock rate at which the multithreaded issue unit is clocked, and wherein the second execution unit clock rate is different from the first execution clock rate;
wherein the control logic is configured to in the first mode configure the multithreaded issue unit to issue multiple instructions to the multirate execution unit per issue unit clock cycle, wherein the first execution unit clock rate is double the issue unit clock rate, wherein the second execution unit clock rate equals the issue unit clock rate, wherein the multirate execution unit includes first and second issue ports and is configured to alternate in each clock cycle between initiating execution of an instruction received in the first issue port and initiating execution of an instruction received in the second issue port, wherein the multithreaded issue unit is configured to receive instructions from N threads, and wherein the multithreaded issue unit further comprises:

first and second multiplexers coupled respectively to the first and second issue ports of the multirate execution unit;
first issue select logic coupled to a first input of the first multiplexer, the first issue select logic configured to select one instruction from among a first subset of the N threads each cycle of the issue unit clock;
second issue select logic coupled to a first input of the second multiplexer, the second issue select logic configured to select one instruction from among a second subset of the N threads each cycle of the issue unit clock; and
third issue select logic coupled to second inputs of each of the first and second multiplexers, the third issue select logic configured to select one instruction from among the N threads each cycle of the issue unit clock;
wherein the control logic is coupled to the first and second multiplexers and configured in the first mode to select the first inputs of the first and second multiplexers such that an instruction selected by the first issue select logic is output to the first issue port to initiate execution thereof on the rising edge of the issue unit clock and an instruction selected by the second issue select logic is output to the second issue port to initiate execution thereof on the falling edge of the issue unit clock, and wherein the control logic is configured in the second mode to select the second inputs of the first and second multiplexers such that an instruction selected by the third issue select logic is output to the first and second issue ports to initiate execution thereof on the rising edge of the issue unit clock.

* * * * *